United States Patent
Hamaguchi et al.

(10) Patent No.: US 7,311,863 B2
(45) Date of Patent: Dec. 25, 2007

(54) METHOD FOR PRODUCING GLASS-LIKE CARBON PIPE, AND GLASS-LIKE CARBON PIPE PRODUCED BY SUCH METHOD

(75) Inventors: Maki Hamaguchi, Kobe (JP); Keiji Kishimoto, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 516 days.

(21) Appl. No.: 10/831,151

(22) Filed: Apr. 26, 2004

(65) Prior Publication Data

US 2004/0238982 A1    Dec. 2, 2004

(30) Foreign Application Priority Data

May 28, 2003    (JP)    ............... 2003-151019

(51) Int. Cl.
*B28B 1/20*    (2006.01)
*C03B 31/00*    (2006.01)
(52) U.S. Cl. ..................... 264/29.1; 264/311
(58) Field of Classification Search .............. 264/29.1, 264/311
See application file for complete search history.

(56) References Cited

U.S. PATENT DOCUMENTS

| | | | | |
|---|---|---|---|---|
| 1,868,037 | A * | 7/1932 | Weatherhead, Jr. | .... 29/890.149 |
| 2,874,412 | A * | 2/1959 | Flemming et al. | .......... 264/311 |
| 2,986,411 | A * | 5/1961 | Anderson | ............... 285/293.1 |
| 3,235,530 | A * | 2/1966 | Crouch et al. | ............... 523/216 |
| 4,518,556 | A * | 5/1985 | Yamamoto et al. | ......... 264/295 |
| 4,628,965 | A * | 12/1986 | Passerell | ....................... 138/89 |
| 4,714,578 | A * | 12/1987 | Cagle et al. | ................. 264/255 |
| 5,060,509 | A * | 10/1991 | Webb | ....................... 73/40.5 R |
| 5,785,247 | A * | 7/1998 | Chen et al. | ................. 239/135 |
| 6,578,880 | B2 * | 6/2003 | Watts | .......................... 285/334 |
| 6,634,413 | B2 * | 10/2003 | Ray et al. | .................... 164/114 |
| 6,660,093 | B2 * | 12/2003 | Hamaguchi et al. | ........ 118/715 |

FOREIGN PATENT DOCUMENTS

JP    04191017 A  *   7/1992
JP    2001-151574       6/2001

* cited by examiner

*Primary Examiner*—Suzanne E. McDowell
(74) *Attorney, Agent, or Firm*—Oblon, Spivak, McClelland, Maier & Neustadt, P.C.

(57) ABSTRACT

A method for producing a glass-like carbon pipe is provided. The method comprises the steps of producing a plurality of thermosetting resin molded articles by centrifugal molding, said molded articles each having the shape of the sections of a pipe divided in the longitudinal direction and each provided with threaded or fitting portions; integrating these molded articles by joining at the threaded or fitting portions; and carbonizing the joined pipe to thereby produce a glass-like carbon pipe. This method is capable of producing a straight or bent pipe with excellent mechanical strength and gas sealability at the joint, and this method enables production of a pipe at a low cost since no machining is required for providing the threaded or fitting portions.

6 Claims, 3 Drawing Sheets

LIQUID RESIN

LIQUID RESIN

US 7,311,863 B2

METHOD FOR PRODUCING GLASS-LIKE CARBON PIPE, AND GLASS-LIKE CARBON PIPE PRODUCED BY SUCH METHOD

BACKGROUND OF THE INVENTION

1. Technical Field

Use of glass-like carbon pipes is being contemplated for a gas injection nozzle and reaction gas delivery pipe of a CVD apparatus. This invention relates to a method for producing a glass-like carbon pipe as well as a glass-like carbon pipe produced by such method.

2. Prior Art

Glass-like carbon is a carbon material, which is typically produced by carbonizing a thermosetting resin such as phenol resin or a furan resin at a high temperature. Glass-like carbon exhibits a heat resistance of 2000° C. or higher in an inert atmosphere, and it also has excellent corrosion resistance to hydrogen fluoride and fluorine. Accordingly, use of a glass-like carbon pipe is contemplated for gas injection nozzles and pipes in pipework for supplying a reaction gas to a CVD apparatus by which a thin film is deposited onto a substrate such as a silicon wafer.

When a glass-like carbon pipe of straight shape which is relatively large in length or of bent shape such as "L" shape is required, several production pathways can be considered. One is to join glass-like carbon pipe sections each configured to be a divided section of such a pipe by using adhesives. However, a product exhibiting satisfactory mechanical strength and gas sealability at the joint could never be produced by this method due to the chemical inertness of the glass-like carbon material.

The other method is to carbonize resin precursor for glass-like carbon pipe formed in such a shape. However, this method is also difficult to complete due to poor formability of thermosetting resins.

In view of such situation, Japanese Patent Application Laid-Open No. 2001-151574 proposes a method wherein sections of a resin precursor for a glass-like carbon pipe of straight shape or bent shape are first produced, and these sections are adhered and then carbonized.

In this prior art method, a cured article of plate shape is produced from a thermosetting resin, for example, by cast molding, and then recesses corresponding to the flow path and the fitting portions of the finished product are formed in the plate-shaped thermosetting resin by machining using a NC machine to thereby produce a pair of thermosetting resin cured articles corresponding pipe halves cut in the direction parallel to the longitudinal axis of the pipe. The cured thermosetting resin articles in the form of pipe halves are then adhered by using the thermosetting resin for the adhesive, and by coating such adhesive on the fitting portions. The thus adhered thermosetting resin cured articles are then carbonized to produce the glass-like carbon pipe.

However, this prior art production method of a glass-like carbon pipe has a drawback of prolonged working time for the machining, and hence, increased production cost since this method involved the step of machining of the brittle plate-shaped thermosetting resin cured product into the required shape using a NC machine or the like, and the machining of the brittle article was associated with the problem of poor workability.

Furthermore, a thermosetting resin cured article often experiences a decrease in the adhesion due to the reduced reactivity of the thermosetting resin when the article is cured to the extent that allows machining. Such reduced adhesion capability resulted in the drawback of difficulty in producing a product having satisfactory mechanical strength and gas sealability at the joint.

SUMMARY OF THE INVENTION

The present invention has been completed in view of the situation as described above, and an object of the present invention is to provide a method for producing a glass-like carbon pipe that is capable of producing a straight or bent pipe with excellent mechanical strength and gas sealability at the joint, and this method enables production of the pipe at a low cost since no machining is required for providing the threaded or fitting portions. Another object of the present invention is to provide a glass-like carbon pipe, which is produced by the method as described above.

Such an object of the present invention is constituted by the present invention as described below.

This invention relates to a method for producing a glass-like carbon pipe comprising the steps of: producing a plurality of pipe-shaped thermosetting resin molded articles having threaded portions by centrifugal molding; integrating the plurality of pipe-shaped thermosetting resin molded articles by joining the threaded portions; heat treating the integrated thermosetting resin molded articles to completely cure the article; and carbonizing the completely cured molded articles to produce the glass-like carbon pipe.

The present invention relates also to a method for producing a glass-like carbon pipe comprising the steps of: producing a plurality of pipe-shaped thermosetting resin molded articles having fitting portions by centrifugal molding; integrating the plurality of pipe-shaped pipe-shaped thermosetting resin molded articles by fitting with each other; heat treating the integrated thermosetting resin molded articles to completely cure the article; and carbonizing the completely cured molded articles to produce the glass-like carbon pipe.

In various aspects of the present invention as described above, the step of complete curing by the heat treatment of the thermosetting resin molded articles, namely, the step of so called "curing" may be carried out as the initial stage of the carbonization step. In other words, the complete curing of thermosetting resin molded articles may be accomplished in the initial stage of the gradual temperature elevation from room temperature to the carbonization temperature.

In the methods for producing a glass-like carbon pipe as described above, a liquid thermosetting resin may be used as an adhesive in integrating the plurality of thermosetting resin molded articles by joining at the threaded or fitting portions.

In the methods for producing a glass-like carbon pipe as described above, joining of the plurality of thermosetting resin molded articles by threading of fitting is preferably carried out when the resin is semi-cured. However, joining may be conducted not only when the resin is semi-cured, but also after the complete curing.

The method for producing a glass-like carbon pipe of the present invention is capable of producing a glass-like carbon pipe of straight or bent shape such as "L" shape that exhibits excellent mechanical strength and gas sealability at the joint, and this method is also capable of producing the pipe at a low cost since no machining is required for providing the threaded portions. Also, the method for producing a glass-like carbon pipe of the present invention is capable of producing a pipe of straight or bent shape such as "L" shape that exhibits excellent mechanical strength and gas sealability at the joint, and this method is also capable of producing the pipe at a low cost since no machining is required for providing the fitting portions.

The straight and the "L" shaped and other bent glass-like carbon pipes produced by the method for producing a glass-like carbon pipe as described above are also within the scope of the present invention.

DETAILED DESCRIPTION OF THE INVENTION

Figure 1:
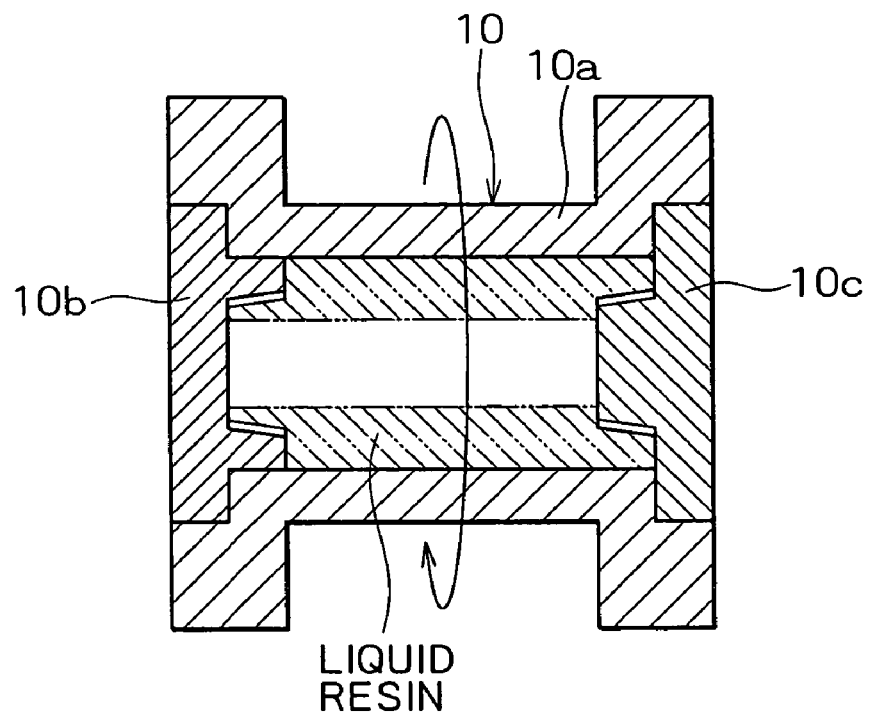
FIG. 1 is a cross sectional view schematically showing the mold used in the centrifugal molding, which is used in Example 1 of the present invention.

In the method for producing a glass-like carbon pipe according to the present invention, thermosetting resin molded articles each having the shape of the sections of a pipe divided in the longitudinal direction and each provided with threaded portions are first produced by centrifugal molding. Centrifugal molding is a method wherein a molten or liquid thermosetting resin is poured into the interior of a cylindrical mold, and the mold containing the resin is rotated so that the resin yields by centrifugal force. Then, the mold is heated to cure the resin. By employing such centrifugal molding, thermosetting resin molded articles each having the shape of the sections of a pipe divided in the longitudinal direction and each provided with threaded portions can be produced without any machining by using a mold section for forming the main portion of the pipe and mold sections for forming the threaded portions. For example, two pieces of thermosetting resin molded article each comprising a straight pipe main portion provided at one end with a male threaded portion and at the other end with a female threaded portion are produced.

Next, a male threaded portion of one thermosetting resin molded article is threaded into the female threaded portion of the other thermosetting resin molded article, and the thus joined thermosetting resin molded articles are heated to a temperature higher than the molding temperature of the molded articles for full curing. In this case, a liquid thermosetting resin may be used as an adhesive, and the thermosetting resin is coated over the threaded portions and cured to firmly join the thermosetting resin molded articles.

A length of straight glass-like carbon pipe can be readily obtained by carbonizing the thermosetting resin molded articles that have been joined by threading as described above. An "L" shaped pipe and other bent pipes may also be obtained by a similar procedure.

Alternatively, in the method for producing a glass-like carbon pipe according to the present invention, thermosetting resin molded articles each having the shape of the sections of a pipe divided in the longitudinal direction and each provided with fitting portions are first produced by centrifugal molding. By employing the centrifugal molding, thermosetting resin molded articles each having the shape of the sections of a pipe divided in the longitudinal direction and each provided with fitting portions can be produced without any machining by using a mold section for forming the main portion of the pipe and mold sections for forming the fitting portions. For example, two pieces of thermosetting resin molded article each comprising a straight pipe main portion provided at one end with a tapered male fitting portion and at the other end with a tapered female fitting portion are produced.

Next, the tapered male fitting portion of one thermosetting resin molded article is fitted with the tapered female fitting portion of the other thermosetting resin molded article, and the thus joined thermosetting resin molded articles are heated to a temperature higher than the molding temperature of the molded articles for full curing. In this case, a liquid thermosetting resin may be used as an adhesive, and the thermosetting resin is coated over the fitting portions and cured to firmly join the thermosetting resin molded articles.

A length of straight glass-like carbon pipe can be readily obtained by carbonizing the thermosetting resin molded articles that have been joined by fitting as described above. An "L" shaped pipe and other bent pipes may also be obtained by a similar procedure.

The liquid thermosetting resin used for the adhesive as described above is preferably the one that is the same as the thermosetting resin used in molding the pipe since the adhesive used will also be converted into the glass-like carbon that is the same as the entire molded article. In this case, the shrinkage upon carbonization will also be the same value as the molded pipe, and the stress caused by the size difference will not be applied to the joint after the carbonization. However, the adhesive may comprise a thermosetting resin of the type different from the molded article since the shrinkage in the carbonization will not be significantly different, and the quality of the resulting carbon will not be that different.

In the production method of the present invention, it is critical that decrease in the size precision of the thermosetting resin molded article is avoided, and also, that generation of cracks in the thermosetting resin molded article is avoided in the cooling and the release from the mold after the centrifugal molding, as described below.

First, with regard to the thermosetting resin, the thermosetting resin used is preferably the one, which is liquid in view of the convenience of the centrifugal molding, and in particular, the one exhibiting reduced shrinkage in the curing. Exemplary such preferable resins include phenol resin, fran resin, and imide resin. The shrinkage in the curing is defined, in the case of molding a cylinder, by the formula: [(internal diameter of the mold)−(outer diameter of the molded article)/(internal diameter of the mold)] (%), and this shrinkage is preferably 1.5% or less. To realize the shrinkage of this range, use of a liquid thermosetting resin such as phenol resin with a moisture content of 5% by weight or less, and preferably 3% by weight or less is preferred. The moisture content is the one measured by the method of Karl Fischer. Use of such liquid thermosetting resin enables decrease in the shrinkage in the curing, and in turn, avoids the loss of size precision and the generation of cracking in the centrifugal molding and the subsequent cooling.

Next, the timing of removing the core in the centrifugal molding is described. A thermosetting resin molded article is poor in toughness, and cracks are most likely to be induced in the thermosetting resin molded article in the case when a core or cores are used in the molding. In the production method of the present invention, cores are used, for example, as the mold sections for the threaded portions. In view of such situation, the inventors found that, in the cooling of the mold during the centrifugal molding, the cores can be removed without inducing cracks in the thermo setting resin molded article if the thermosetting resin molded article is removed from the mold before the temperature of the thermosetting resin molded article reaches the glass transition temperature (Tg) thereof since the thermosetting resin molded article can endure a relatively large distortion without breakage at such temperature. No stress is applied to the thermosetting resin molded article in the course of shrinkage of the thermosetting resin molded article in the cooling if such shrinkage occurs after the core removal, and crack generation in the thermosetting resin molded article is thereby avoided.

In other words, a thermosetting resin molded article free from distortion and cracks can be produced by releasing the molded article from the mold, or at least, by separating the cores from the molded article before the temperature of the thermosetting resin molded article reaches the glass transition temperature in the cooling after the centrifugal molding. It is to be noted that glass transition temperature of the thermosetting resin molded article after the molding can be adjusted to below or around the room temperature by adequately selecting the conditions of the centrifugal molding, and in such a case, the thermosetting resin molded article can be removed from the mold without inducing the cracks by disassembly of the mold sections and cores after the cooling of the mold to the room temperature.

Next, examples of the present invention are described by referring to the drawings.

EXAMPLE 1

In Example 1, thermosetting resin molded articles each having threaded portions were produced by centrifugal molding. These thermosetting resin molded articles had the shape corresponding to halves of a pipe divided in the longitudinal direction. Next, the molded articles were integrated by joining at the thread to thereby connect these articles in longitudinal direction of the pipe, and the thus joined pipe was carbonized to produce a straight glass carbon pipe.

Figure 2:
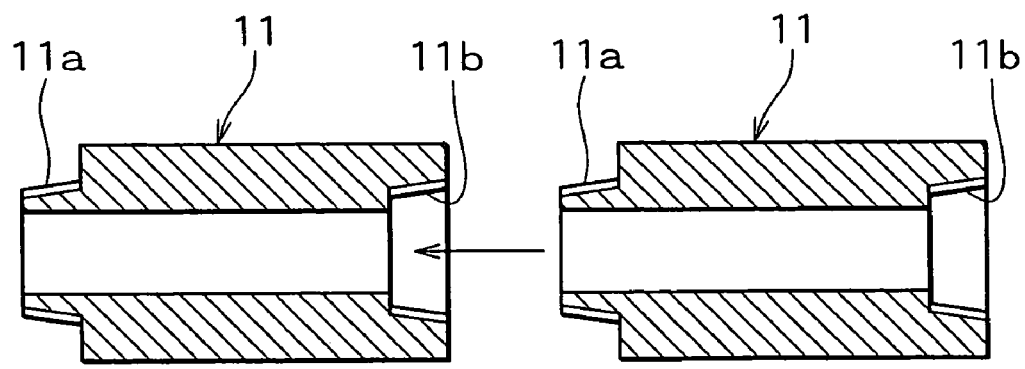
FIG. 2 is a cross sectional view presented to explain the production method of the glass-like carbon pipe according to Example 1.

FIG. 1 is a cross sectional view schematically showing the mold used in Example 1 for centrifugal molding, and FIG. 2 is a cross sectional view for explaining the production method of the glass-like carbon pipe of Example 1.

As shown in FIG. 1, mold 10 for centrifugal molding comprises a mold section 10a for forming the main portion of the pipe, a mold section 10b for forming a tapered male threaded portion 11a on one end of the main portion of the pipe (see FIG. 2), and a mold section 10c for forming a tapered female threaded portion 11b on the other end of the pipe main portion (see FIG. 2). The tapered female threaded portion 11b can be threaded over the tapered male threaded portion 11a.

The mold section 10a for molding the main portion has a cylindrical shape, and shoulders are provided in its interior opposite ends to receive the mold sections 10b and 10c for molding the threaded portions. The mold section 10b for forming the male threaded portion secured to one end of the mold section 10a for molding the main portion has a tapered thread forming area that is dilated toward the longitudinal center of the mold section 10a for molding the main portion. The mold section 10c for forming the female threaded portion secured to the other end of the mold section 10a for molding the main portion has a tapered thread forming area that is dilated toward the longitudinal center of the mold section 10a for molding the main portion. The mold section 10a for molding the main portion is separable into two halves for ease of removing the thermosetting resin molded article. In the centrifugal molding, the thermosetting resin used for the starting material is poured in the interior of the mold 10, and the mold is heated to a temperature higher than the temperature at which the curing reaction of the thermosetting resin is promoted while rotating the mold 10. The heating of the thermosetting resin is enabled by an electric heather surrounding the mold 10.

First, PL4804 manufactured by Gunei Chemical Industry Co., Ltd., which is a commercially available phenol resin, was heat treated at 100° C. for 1 hour to adjust the moisture content. The resin with the moisture content of 5% by weight or less was used as the starting material for the glass-like carbon.

Next, this starting material was poured in the mold 10, and centrifugal molding was conducted by rotating the mold 10 at a predetermined speed for 10 hours while retaining the temperature of the mold 10 at 75° C. When the mold 10 was cooled to 70° C. (i.e., when the thermosetting resin molded article was cooled to 70° C.), the mold sections 10b and 10c for the threaded portions were removed and the molded articles were allowed to cool to room temperature. This centrifugal molding process was repeated twice to produce two pieces of the thermosetting resin molded article 11 as shown in FIG. 2 each comprising a straight pipe main portion provided at one end with a tapered male threaded portion 11a, and at the other end with a tapered female threaded portion 11b. Glass transition temperature (Tg) of resin obtained under the above specified conditions was measured to be 58° C. by a differential scanning calorimeter (DSC). When the mold 10 was allowed to cool to room temperature without removing the mold sections 10b and 10c for threaded portions, cracks developed in the tapered threaded portions 11a and 11b. For this reason, the thermosetting resin molded article of good performance could not be produced.

Next, an adhesive was applied on the tapered female threaded portion 11b and the annular abutting surface extending from this female threaded portion 11b on one of the thermosetting resin molded article 11. The adhesive was also applied on the tapered male threaded portion 11a and the annular abutting surface extending from this male threaded portion 11a on the other thermosetting resin molded article 11. The adhesive used was the liquid phenol resin that was the same as the one used as the starting material for the glass-like carbon. Into the tapered female threaded portion 11b of one thermosetting resin molded article 11 was threaded the tapered male threaded portion 11a of the other thermosetting resin molded article 11 for adhesion, and the molded articles were maintained at 80° C. for 24 hours to thereby integrate the two thermosetting resin molded articles 11. The integrated articles were further heated in air to 250° C. for 48 hours for complete curing.

Next, the two thermosetting resin molded articles 11 that had been joined into a one-piece unit were heat treated in nitrogen atmosphere at 1000° C. for carbonization to thereby produce a glass-like carbon pipe having a thickness of 1 mm, an outer diameter of 10 mm, and a length of 900 mm. This straight glass-like carbon pipe exhibited excellent mechanical strength and gas sealability of the joint.

EXAMPLE 2

In Example 2, a thermosetting resin molded article in the form of a straight pipe having a threaded portion for receiving a side pipe was produced by centrifugal molding. This thermosetting resin molded article was formed with a threaded portion at one end, and the threaded portion for receiving the side pipe near the other closed end. Next, this molded article in the form of a straight pipe was joined by threading with another molded article in the form of a straight pipe having a threaded portion at one end to thereby form an "L" shaped pipe. The thus joined pipe was carbonized to produce an "L" shaped glass carbon pipe.

Figure 3:
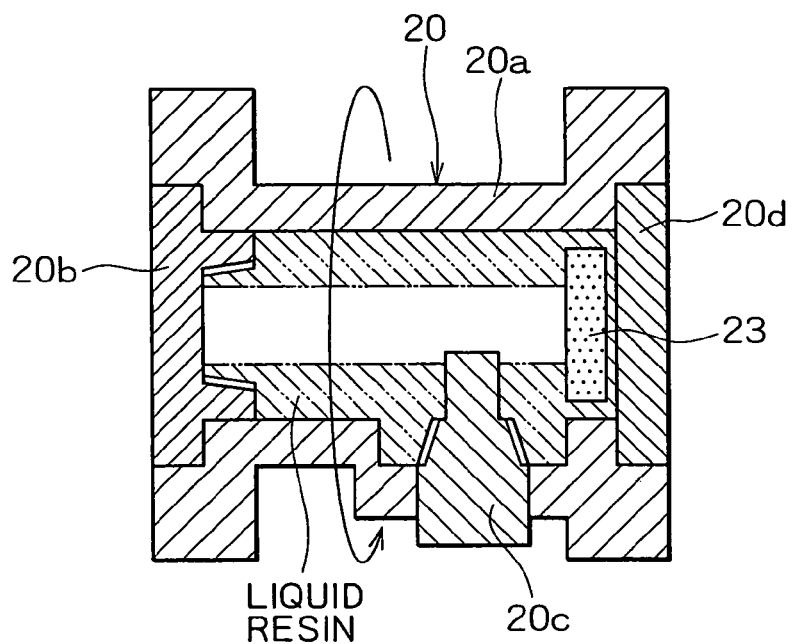
FIG. 3 is a cross sectional view schematically showing the mold used in the centrifugal molding, which is used in Example 2 of the present invention.
Figure 4:
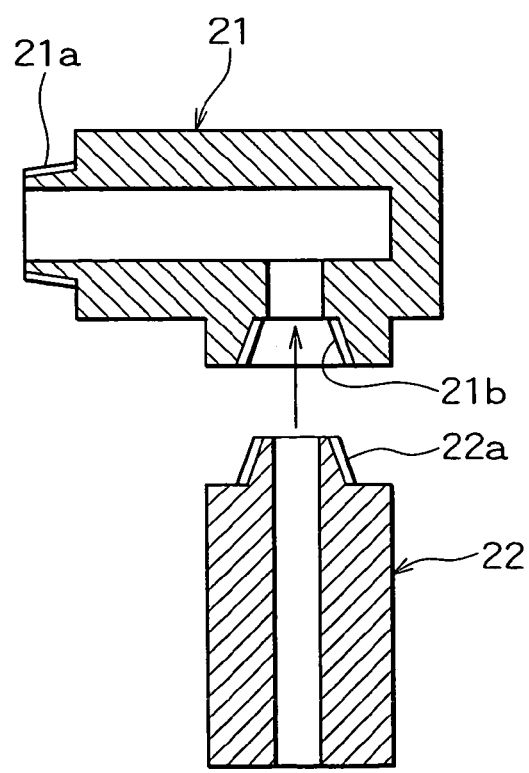
FIG. 4 is a cross sectional view presented to explain the production method of the glass-like carbon pipe according to Example 2.

FIG. 3 is a cross sectional view schematically showing the mold used in Example 2 for centrifugal molding, and FIG. 4 is a cross sectional view for explaining the production method of the glass-like carbon pipe of Example 2.

As shown in FIG. 3, a mold 20 comprises a mold section 20*a* for forming the main portion of the pipe, a mold section 20*b* for forming a tapered male threaded portion 21*a* on one end of the main portion of the pipe (see FIG. 4), a mold section 20*c* for forming a tapered female threaded portion 21*b* for receiving a side pipe near the other end of the pipe main portion (see FIG. 4), and a mold section 20*d* for closing the other end of the pipe main portion.

In the centrifugal molding, a resin plate 23 formed from a thermosetting resin in the shape of a plate is placed in the mold 20 as shown in FIG. 3. This resin plate 23 is a plate that has been cured to the extent allowing working such as cutting, and this resin plate will be a part of the "L" shaped glass-like carbon pipe.

Centrifugal molding was conducted by using the starting material and the molding conditions which were the same as those used in Example 1 to produce a thermosetting resin molded article 21 as shown in FIG. 4 comprising the pipe main portion extending in a straight line having a tapered male threaded portion 21*a* at one end and a tapered female threaded portion 21*b* for receiving the side pipe near the other closed end. Meanwhile, centrifugal molding was also conducted by using the starting material and the molding conditions the same as those used in Example 1 by using a mold (not shown) to produce a thermosetting resin molded article 22 for use as the side pipe. This thermosetting resin molded article 22 had a pipe main portion extending in a straight line formed with a tapered male threaded portion 22*a* at one end, which can be threaded in the tapered female threaded portion 21*b* for receiving the side pipe.

Into the tapered female threaded portion 21*b* for receiving the side pipe was threaded the tapered male threaded portion 22*a* for adhesion, and the articles were maintained at 80° C. for 24 hours to thereby join the thermosetting resin molded article 21 and the side pipe thermosetting resin molded article 22. The joined articles were further heated in air to 250° C. for 48 hours for complete curing. The adhesive used was the liquid phenol resin, and was the same as the one used in Example 1.

Next, the two thermosetting resin molded articles 21 and 22 that had been joined into a one-piece unit were heat treated in nitrogen atmosphere at 1000° C. for carbonization to thereby produce an "L" shaped glass-like carbon pipe. This "L" shaped glass-like carbon pipe exhibited excellent mechanical strength and gas sealability of the joint.

EXAMPLE 3

In Example 3, thermosetting resin molded articles each having fitting portions were produced by centrifugal molding. These thermosetting resin molded articles had the shape corresponding to halves of a pipe divided in the longitudinal direction. Next, the molded articles were joined by fitting to thereby connect these articles in longitudinal direction of the pipe, and the thus joined pipe was carbonized to produce a straight glass carbon pipe.

Figure 5:
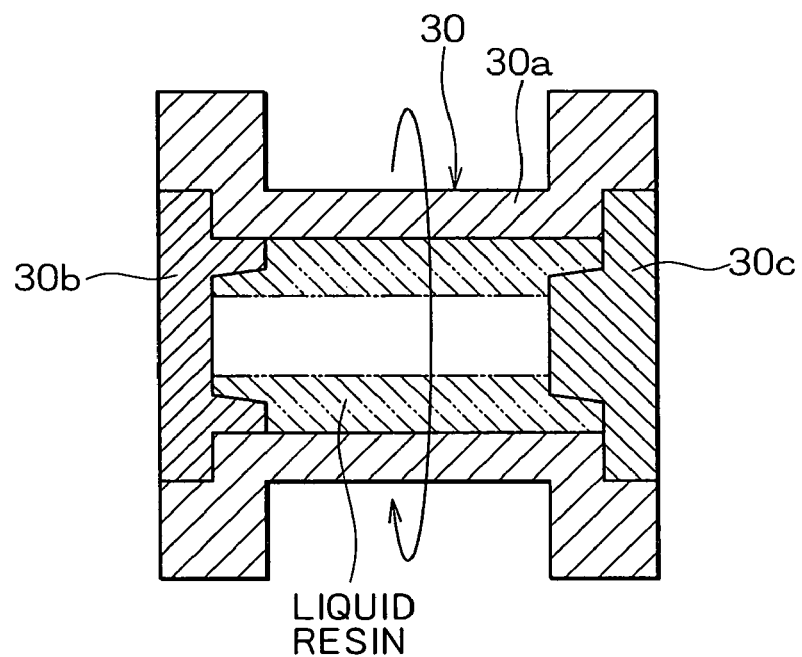
FIG. 5 is a cross sectional view schematically showing the mold used in the centrifugal molding, which is used in Example 3 of the present invention.
Figure 6:
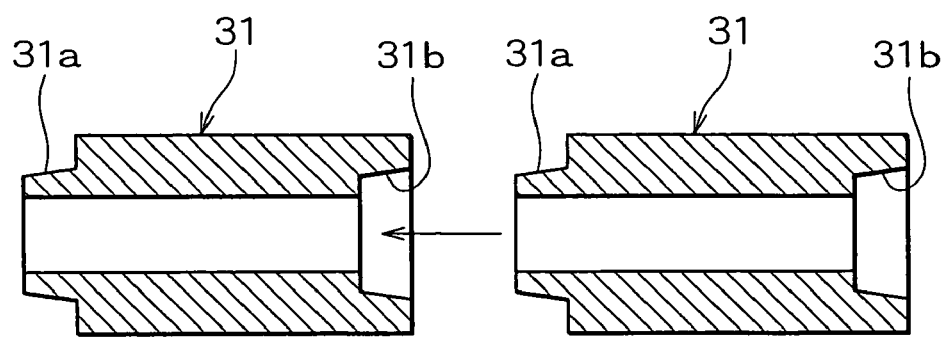
FIG. 6 is a cross sectional view presented to explain the production method of the glass-like carbon pipe according to Example 3.

FIG. 5 is a cross sectional view schematically showing the mold used in Example 3 for centrifugal molding, and FIG. 6 is a cross sectional view for explaining the production method of the glass-like carbon pipe of Example 3.

As shown in FIG. 5, mold 30 for centrifugal molding comprises a mold section 30*a* for forming the main portion of the pipe, a mold section 30*b* for forming a tapered male fitting portion 31*a* on one end of the main portion of the pipe (see FIG. 6), and a mold section 30*c* for forming a tapered female fitting portion 31*b* on the other end of the pipe main portion (see FIG. 6). The tapered female fitting portion 31*b* can be fitted over the tapered male fitting portion 31*a*. The mold section 30*a* for molding the main portion has a cylindrical shape, and shoulders are provided in its interior opposite ends to receive the mold sections 30*b* and 30*c* for molding the fitting portions. The mold section 30*b* for forming the male fitting portion secured to one end of the mold section 30*a* for molding the main portion has a tapered fitting forming area that is dilated toward the longitudinal center of the mold section 30*a* for molding the main portion. The mold section 30*c* for forming the female fitting portion secured to the other end of the mold section 30*a* for molding the main portion has a tapered fitting forming area that is dilated toward the longitudinal center of the mold section 30*a* for molding the main portion.

Centrifugal molding was conducted by using the starting material and the molding conditions the same as those used in Example 1 to produce two thermosetting resin molded articles 31 as shown in FIG. 6 comprising the pipe main portion extending in a straight line having a tapered male fitting portion 31*a* at one end and a tapered female fitting portion 31*b* on the other end.

Into the tapered female fitting portion 31*b* was fitted the tapered male fitted portion 31*a* for adhesion, and the articles were maintained at 80° C. for 24 hours to thereby join the two thermosetting resin molded articles 31. The joined articles were further heated in air to 250° C. for 48 hours for complete curing. The adhesive used was the liquid phenol resin that was the same as the one used in Example 1. The adhesive was applied on the tapered female fitting portion 31*b* and the annular abutting surface extending from this female fitting portion 31*b* on one of the thermosetting resin molded article 31. The adhesive was also applied on the tapered male fitting portion 31*a* and the annular abutting surface extending from this male fitting portion 31*a* on the other thermosetting resin molded article 31.

Next, the two thermosetting resin molded articles 31 that had been joined into a one-piece unit were heat treated in nitrogen atmosphere at 1000° C. for carbonization to thereby produce a glass-like carbon pipe having a thickness of 1 mm, an outer diameter of 10 mm, and a length of 900 mm. This straight glass-like carbon pipe exhibited excellent mechanical strength and gas sealability of the joint.

It is to be noted that an "L" shaped glass carbon pipe exhibiting excellent mechanical strength and gas sealability of the joint could be produced by forming, in the thermosetting resin molded article 21 of FIG. 4, a tapered male fitting portion instead of the tapered male threaded portion 21*a*; and a tapered female fitting portion instead of the tapered female threaded portion 21*b*; and in the side pipe thermosetting resin molded article 22, forming a tapered male fitting portion instead of the tapered male threaded portion 22a.

COMPARATIVE EXAMPLE 1

A simple cylindrical thermosetting resin molded article with no threaded portions was produced by using the starting material that was the same as the one used in Example 1. An attempt was made to form a tapered male threaded portion and a tapered female threaded portion by machining in the thermosetting resin molded article. However, the thermosetting resin molded article was brittle and hardly machinable, and became fractured.

COMPARATIVE EXAMPLE 2

Two simple cylindrical thermosetting resin molded article with no threaded portions were produced by using the starting material that was the same as the one used in Example 1. The two thermosetting resin molded articles were joined together by applying a liquid phenol resin on the abutting surfaces of the molded article, and curing and carbonizing under the same conditions as those employed in Example 1. The resulting glass-like carbon pipe was deformed during the carbonization, and joint strength was insufficient.

COMPARATIVE EXAMPLE 3

Centrifugal molding and the carbonization were conducted under the same conditions as those used in Example 1 to produce two glass-like carbon pipes of the length half the resulting pipe each having a pipe main portion formed with a tapered male threaded portion on one end and a tapered female threaded portion on the other end. The two glass-like carbon pipes were joined by threading using a liquid phenol resin for the adhesive, and the joined pipe was carbonized under the same conditions as those of Example 1. The resulting straight glass-like carbon pipe exhibited insufficient gas sealability at the joint due to the chemical inactivity of the glass-like carbon, and use of such glass-like carbon pipe was impractical.

What is claimed is:

1. A method for producing a glass-like carbon pipe comprising the steps of
    pouring a resin into a mold for forming a main portion of the pipe, said mold having a first and second opening formed therein;
    positioning a first mold section at said first opening of said mold for forming a tapered male threaded portion on a first end of the pipe;
    positioning a second mold section at said second opening of said mold for forming a tapered female threaded portion on a second end of the pipe;
    producing a plurality of pipe-shaped thermosetting resin molded articles in said mold, each having said male and female threaded portions by centrifugal molding;
    heat treating the integrated thermosetting resin molded articles to completely cure the article;
    carbonizing the completely cured molded articles to produce the glass-like carbon pipe; and
    integrating the plurality of pipe-shaped thermosetting resin molded articles by joining said male and female threaded portions of the molded articles so as to form the pipe.

2. The method for producing a glass-like carbon pipe according to claim 1 wherein a liquid thermosetting resin is used as an adhesive in integrating said plurality of thermosetting resin molded articles by joining at the male and female threaded portions.

3. A method for producing a glass-like carbon pipe comprising the steps of
    pouring a resin into a mold for forming a main portion of the pipe, said mold having a first and second opening formed therein;
    positioning a first mold section at said first opening of said mold for forming a tapered male fining portion on a first end of the pipe;
    positioning a second mold section at said second opening of said mold for forming a tapered female fitting portion on a second end of the pipe;
    producing a plurality of pipe-shaped thermosetting resin molded articles in said mold each having said male and female fitting portions by centrifugal molding;
    heat treating the integrated thermosetting resin molded articles to completely cure the article;
    carbonizing the completely cured molded articles to produce the glass-like carbon pipe; and
    integrating the plurality of pipe-shaped pipe-shaped thermosetting resin molded articles by fitting said molded articles with each other.

4. The method for producing a glass-like carbon pipe according to claim 3 wherein a liquid thermosetting resin is used as an adhesive in integrating said plurality of thermosetting resin molded articles by fitting with each other.

5. A method for producing glass-like carbon pipe articles comprising the steps of
    pouring a resin into a mold for forming a main portion of the pipe, said mold having a first and second opening formed therein;
    positioning a first mold section at said first opening of said mold for forming a tapered male threaded portion on a first end of the pipe;
    positioning a second mold section at said second opening of said mold for forming a tapered female threaded portion on a second end of the pipe;
    producing a plurality of pipe-shaped thermosetting resin molded articles in said mold, each having said male and female threaded portions by centrifugal molding;
    heat treating the integrated thermosetting resin molded articles to completely cure the article; and
    carbonizing the completely cured molded article to produce the glass-like carbon pipe articles.

6. A method for producing glass-like carbon pipe articles comprising the steps of
    pouring a resin into a mold for forming a main portion of the pipe, said mold having a first and second opening formed therein;
    positioning a first mold section at said first opening of said mold for forming a tapered male fitting portion on a first end of the pipe;
    positioning a second mold section at said second opening of said mold for forming a tapered female fitting portion on a second end of the pipe;
    producing a plurality of pipe-shaped thermosefting resin molded articles in said mold each having said male and female fitting portions by centrifugal molding;
    heat treating the integrated thermosetting resin molded articles to completely cure the article; and
    carbonizing the completely cured molded articles.

* * * * *

UNITED STATES PATENT AND TRADEMARK OFFICE
CERTIFICATE OF CORRECTION

PATENT NO.         : 7,311,863 B2                                              Page 1 of 1
APPLICATION NO. : 10/831151
DATED               : December 25, 2007
INVENTOR(S)        : Maki Hamaguchi et al.

It is certified that error appears in the above-identified patent and that said Letters Patent is hereby corrected as shown below:

On the title page, Item (73), the Assignee information is incorrect. Item (73) should read as follows:

-- (73)  Assignee:  Kabushiki Kaisha Kobe
              Seiko Sho (Kobe Steel, Ltd.),
              Kobe-shi, (JP) --

Signed and Sealed this

Twenty Second Day of April, 2008

JON W. DUDAS
*Director of the United States Patent and Trademark Office*